United States Patent
Cheong et al.

(10) Patent No.: US 12,156,112 B2
(45) Date of Patent: Nov. 26, 2024

(54) METHOD OF ULTRA-WIDEBAND COMMUNICATION BASED ON ACCOUNT INFORMATION AND ELECTRONIC DEVICE THEREFOR

(71) Applicant: Samsung Electronics Co., Ltd., Gyeonggi-do (KR)

(72) Inventors: Gupil Cheong, Gyeonggi-do (KR); Moonseok Kang, Gyeonggi-do (KR); Hyunchul Kim, Gyeonggi-do (KR); Yi Yang, Gyeonggi-do (KR); Moongee Cho, Gyeonggi-do (KR); Doosuk Kang, Gyeonggi-do (KR); Bokun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 17/721,448

(22) Filed: Apr. 15, 2022

(65) Prior Publication Data

US 2022/0337986 A1      Oct. 20, 2022

Related U.S. Application Data

(63) Continuation of application No. PCT/KR2022/004841, filed on Apr. 5, 2022.

(30) Foreign Application Priority Data

Apr. 20, 2021   (KR) .................. 10-2021-0051252

(51) Int. Cl.
*H04W 4/80*      (2018.01)
*H04W 4/02*      (2018.01)
*H04W 76/15*     (2018.01)

(52) U.S. Cl.
CPC ............. *H04W 4/80* (2018.02); *H04W 4/023* (2013.01); *H04W 76/15* (2018.02)

(58) Field of Classification Search
CPC ........................................ H04W 4/80
See application file for complete search history.

(56) References Cited

U.S. PATENT DOCUMENTS 9,137,769 B2    9/2015  Jung et al.
9,189,182 B2    11/2015 Jung et al.
(Continued)

FOREIGN PATENT DOCUMENTS

CN            112433201 A     3/2021
KR     10-2014-0046041 A     4/2014
(Continued)

OTHER PUBLICATIONS

International Search Report Dated Jul. 26, 2022.

*Primary Examiner* — Wen W Huang
(74) *Attorney, Agent, or Firm* — Cha & Reiter, LLC

(57) ABSTRACT

Disclosed is an electronic device configured to transmit an advertising signal using a first communication circuit, establish a connection with each of a plurality of external electronic devices based on one or more response signals for the advertising signal using the first communication circuit, receive an identifier from each of the plurality of external electronic devices, identify at least two external electronic devices corresponding to the same group or the same identifier among the plurality of external electronic devices based on the received identifier, determine a ranging device among the at least two external electronic devices based on communication quality related to the plurality of external electronic devices, and perform UWB ranging with the determined ranging device.

21 Claims, 7 Drawing Sheets

(56) References Cited

U.S. PATENT DOCUMENTS

| | | | |
|---|---|---|---|
| 9,769,686 B2 | 9/2017 | Kang et al. | |
| 11,019,567 B2 | 5/2021 | Foster et al. | |
| 11,184,153 B2 | 11/2021 | Hammerschmidt et al. | |
| 11,184,810 B2 | 11/2021 | Reddy et al. | |
| 11,272,556 B2 | 3/2022 | Hariharan et al. | |
| 11,399,372 B2 | 7/2022 | Jang et al. | |
| 11,435,462 B2 | 9/2022 | Hong et al. | |
| 11,875,209 B2* | 1/2024 | Steffl | H04W 76/14 |
| 2010/0195539 A1* | 8/2010 | Tian | H04W 76/15 370/255 |
| 2011/0107117 A1 | 5/2011 | Jung et al. | |
| 2014/0213252 A1 | 7/2014 | Jung et al. | |
| 2015/0351142 A1* | 12/2015 | Seymour | H04R 25/554 455/41.3 |
| 2019/0135229 A1* | 5/2019 | Ledvina | H04W 12/06 |
| 2020/0014526 A1 | 1/2020 | Hammerschmidt et al. | |
| 2020/0082370 A1* | 3/2020 | Yang | G06F 3/04847 |
| 2020/0106877 A1* | 4/2020 | Ledvina | H04M 1/72457 |
| 2020/0128620 A1* | 4/2020 | Han | H04W 76/15 |
| 2020/0272221 A1 | 8/2020 | Foster et al. | |
| 2021/0006652 A1 | 1/2021 | Ledvina et al. | |
| 2021/0051458 A1 | 2/2021 | Cheong et al. | |
| 2021/0051532 A1 | 2/2021 | Reddy et al. | |
| 2021/0055370 A1* | 2/2021 | Tolentino | G01S 5/14 |
| 2021/0072373 A1* | 3/2021 | Schoenberg | G01S 13/765 |
| 2021/0076434 A1 | 3/2021 | Hariharan et al. | |
| 2021/0195415 A1* | 6/2021 | Yang | H04L 63/18 |
| 2021/0258418 A1 | 8/2021 | Ledvina et al. | |
| 2022/0099816 A1* | 3/2022 | Eber | G07C 9/00309 |
| 2022/0268875 A1* | 8/2022 | Szebenyei | G01S 13/74 |

FOREIGN PATENT DOCUMENTS

| | | |
|---|---|---|
| KR | 10-1442618 B1 | 9/2014 |
| KR | 10-2014-0135569 A | 11/2014 |
| KR | 10-2020-0104254 A | 9/2020 |
| KR | 10-2020-0111558 A | 9/2020 |
| KR | 10-2021-0002822 A | 1/2021 |
| KR | 10-2021-0029682 A | 3/2021 |
| WO | 2021033894 A1 | 2/2021 |

* cited by examiner

METHOD OF ULTRA-WIDEBAND COMMUNICATION BASED ON ACCOUNT INFORMATION AND ELECTRONIC DEVICE THEREFOR

CROSS-REFERENCE TO RELATED APPLICATION(S)

This application is a Continuation of International Application No. PCT/KR2022/004841, filed on Apr. 5, 2022, which claims priority under 35 U.S.C. § 119 to Korean Patent Application No. 10-2021-0051252, filed on Apr. 20, 2021, in the Korean Intellectual Property Office, the disclosure of which is incorporated by reference herein in its entirety.

BACKGROUND

1. Technical Field

One or more embodiments of the instant disclosure generally relate to an ultra-wideband communication method based on account information and an electronic device therefor.

2. Description of Related Art

In conventional positioning systems, position tracking systems based on satellite signals are widely used. However, in indoor places, position tracking based on satellite signals is difficult and has low accuracy. In particular, an application that operates based on the distance between two electronic devices would require high positioning accuracy. In another example, an application supporting keyless entry may be required to allow user access only when a user is present within a particular distance.

UWB communication may be used in order to achieve more accurate measurement of distance and high data throughput. In UWB communication, an electronic device may communicate with another electronic device using a pulse signal at a wideband frequency of at least 500 MHz. Due to wideband characteristics, the electronic device may highly accurately identify the distance to the other electronic device. Since UWB communication uses wideband frequency, UWB communication may provide a solution that is more robust against path delay such as multi-path. Furthermore, UWB communication may minimize interference with another wireless communication protocol by using the pulse signal.

A mobile electronic device such as a cell phone may have limited available power. Therefore, when a UWB communication module for the UWB communication is continuously activated, battery consumption of the electronic device may increase. In order to reduce power consumption of the electronic device, UWB communication may be activated based on Bluetooth communication (e.g., Bluetooth low energy (BLE)) having relatively lower power consumption. For example, the electronic device may be configured to perform, after performing Bluetooth-based communication with an external electronic device, UWB communication with the external electronic device based on a communication result.

SUMMARY

Electronic devices supporting wireless connections are widely used. The number of wireless electronic devices carried by users is also increasing. For example, wireless connection-based earbuds may be used instead of wired earphones. Furthermore, unlike typical watches, the user may wear an electronic device such as a smart watch that may support wireless connection to another electronic device (e.g., cell phone) of the user. Furthermore, the number of electronic devices supporting wireless connections disposed close to each other, e.g. within the same room, such as printers and cameras supporting wireless connections, is also increasing.

When activating Bluetooth-based UWB communication, if there are many surrounding electronic devices supporting Bluetooth, the electronic device may be required to attempt to perform UWB communication with all of the surrounding electronic devices. For example, the electronic device may attempt to perform UWB ranging after establishing a Bluetooth connection to each of the surrounding electronic devices. For the UWB ranging, the electronic device may perform contention-based ranging. For example, the electronic device may perform the UWB ranging by broadcasting a ranging signal and receiving responses from the surrounding electronic devices within a specified time. In this case, a collision may occur between the responses, since the surrounding electronic devices transmit the responses simultaneously. A response waiting time of the electronic device may be increased in order to reduce the collision, but the accuracy of the UWB ranging may decrease due to the increase in the response waiting time. Moreover, power consumption of the surrounding electronic devices may increase since the ranging is performed.

One or more embodiments disclosed in the disclosure may provide an electronic device and a method for resolving the above-described problems.

An electronic device according to an embodiment of the disclosure may include a first communication circuit supporting communication based on Bluetooth protocol, a second communication circuit supporting communication based on an ultra-wideband (UWB) protocol, a processor operatively connected to the first communication circuit and the second communication circuit, and a memory operatively connected to the processor. The memory may store instructions that, when executed by the processor, cause the electronic device to transmit an advertising signal using the first communication circuit, establish a connection with each of a plurality of external electronic devices based on one or more response signals for the advertising signal using the first communication circuit, receive an identifier from each of the plurality of external electronic devices, identify at least two external electronic devices corresponding to the same group or the same identifier among the plurality of external electronic devices based on the received identifier, determine a ranging device among the at least two external electronic devices based on communication quality related to the plurality of external electronic devices, and perform UWB ranging with the determined ranging device using the second communication circuit.

A method for ultra-wideband (UWB) communication of an electronic device according to an embodiment of the disclosure may include transmitting an advertising signal based on a Bluetooth protocol, establishing a connection, that is based on the Bluetooth protocol, with each of a plurality of external electronic devices based on one or more response signals for the advertising signal, receiving an identifier from each of the plurality of external electronic devices based on the Bluetooth protocol, identifying at least two external electronic devices corresponding to the same group or the same identifier among the plurality of external electronic devices based on the received identifier, determining a ranging device among the at least two external electronic devices based on communication quality related to the plurality of external electronic devices, and performing UWB ranging with the determined ranging device based on a UWB protocol.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

With respect to the description of the drawings, the same or similar reference signs may be used for the same or similar elements.

DETAILED DESCRIPTION

An electronic device according to an embodiment of the disclosure may determine an external electronic device with which to perform UWB communication using account information.

An electronic device according to an embodiment of the disclosure may reduce power consumption of peripheral devices by determining an external electronic device with which to perform UWB communication based on account information.

An electronic device according to an embodiment of the disclosure may prevent a collision between a plurality of electronic devices through selective UWB communication.

Besides, various effects may be provided that are directly or indirectly identified through the disclosure.

Hereinafter, various embodiments of the disclosure will be described in detail with reference to the accompanying drawings. However, it should be understood that the present invention is not limited to specific embodiments, but rather includes various modifications, equivalents and/or alternatives of various embodiments of the present invention.

Figure 1:
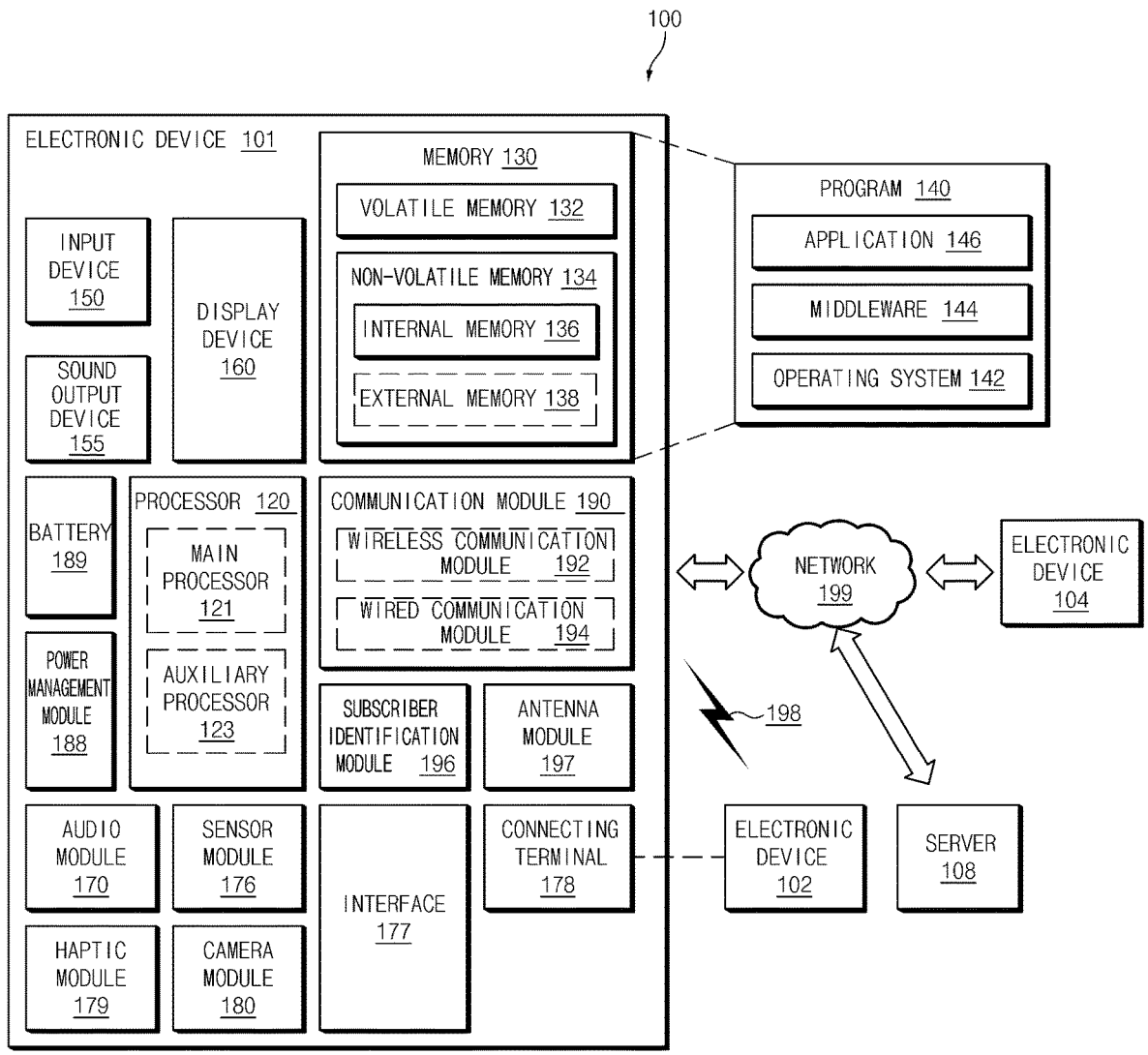
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
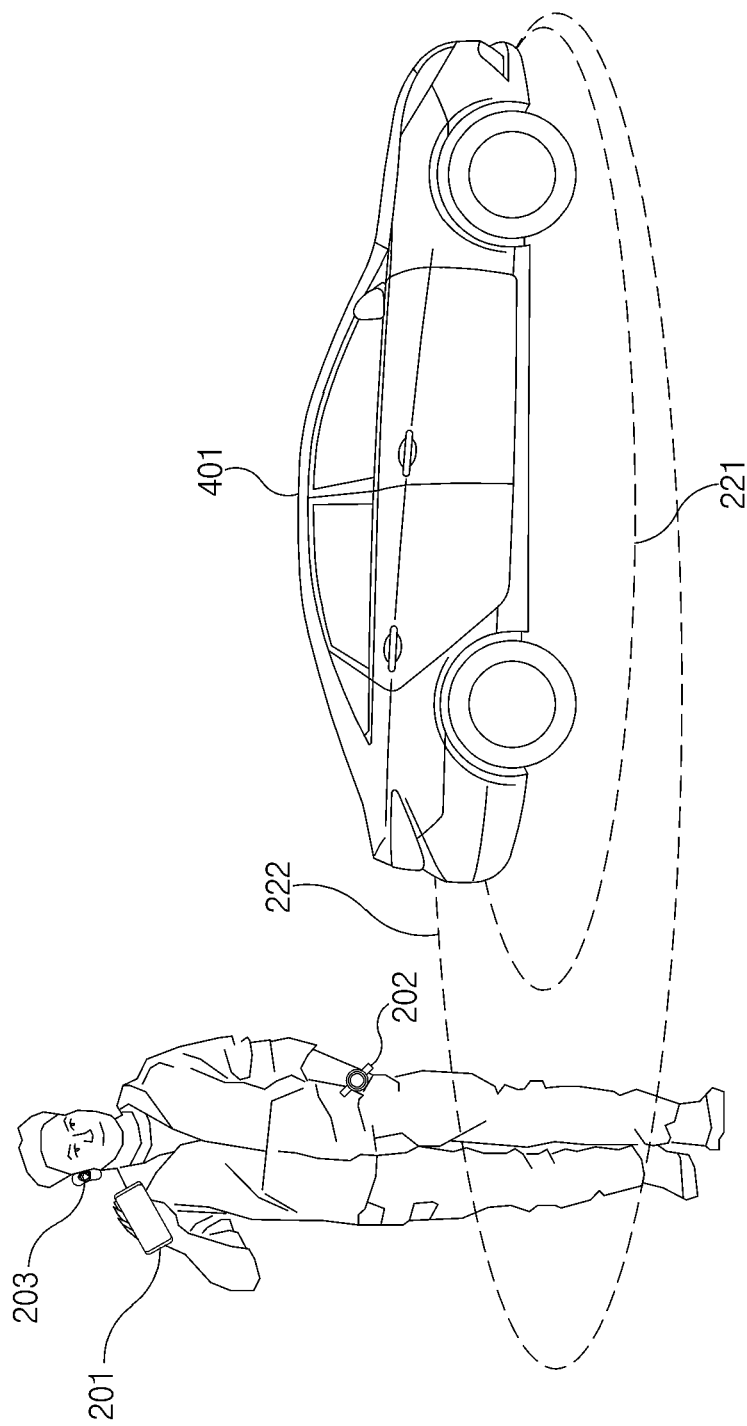
FIG. 2 illustrates a UWB communication environment according to an embodiment.

FIG. 2 illustrates a UWB communication environment according to an embodiment.

In the example of FIG. 2, a user may carry a first electronic device 201, a second electronic device 202, and a third electronic device 203. Although the first electronic device 201, the second electronic device 202, and the third electronic device 203 are illustrated as a mobile phone, a smart watch, and an earbud respectively in FIG. 2, embodiments of the disclosure are not limited thereto. For example, each of the first electronic device 201, the second electronic device 202, and the third electronic device 203 may be any electronic device supporting UWB communication and Bluetooth communication (e.g., Bluetooth legacy and/or BLE).

An electronic device 401, for example, may be a vehicle owned by the user. Although FIG. 2 illustrates the electronic device 401 as a vehicle, embodiments of the disclosure are not limited thereto. For example, the electronic device 401 may be any electronic device (e.g., door lock, point of sale (POS), or beacon) supporting a UWB-based application (e.g., keyless entry, payment, or positioning).

According to an embodiment, the electronic device 401 may perform UWB and/or Bluetooth-based communication with another electronic device present within a second coverage 222. For example, the electronic device 401 may perform Bluetooth communication with another electronic device located within the second coverage 222, and may perform UWB ranging with the other electronic device through the Bluetooth communication. When it is identified that the other electronic device is located within a first coverage 221 as a result of the UWB ranging, the electronic device 401 may perform an operation according to a UWB-based application. For example, the electronic device 401 may unlock a door of the vehicle. In an example, after performing additional authentication on the user, the electronic device 401 may unlock the door of the vehicle if the authentication is successful.

Hereinafter, operations for UWB ranging between the electronic device 401 and the first electronic device 201 will be described with reference to FIG. 3. For convenience, descriptions will be provided with respect to the first electronic device 201, but the second electronic device 202 and the third electronic device 203 may perform UWB ranging with the electronic device 401 in the same manner.

Figure 3:
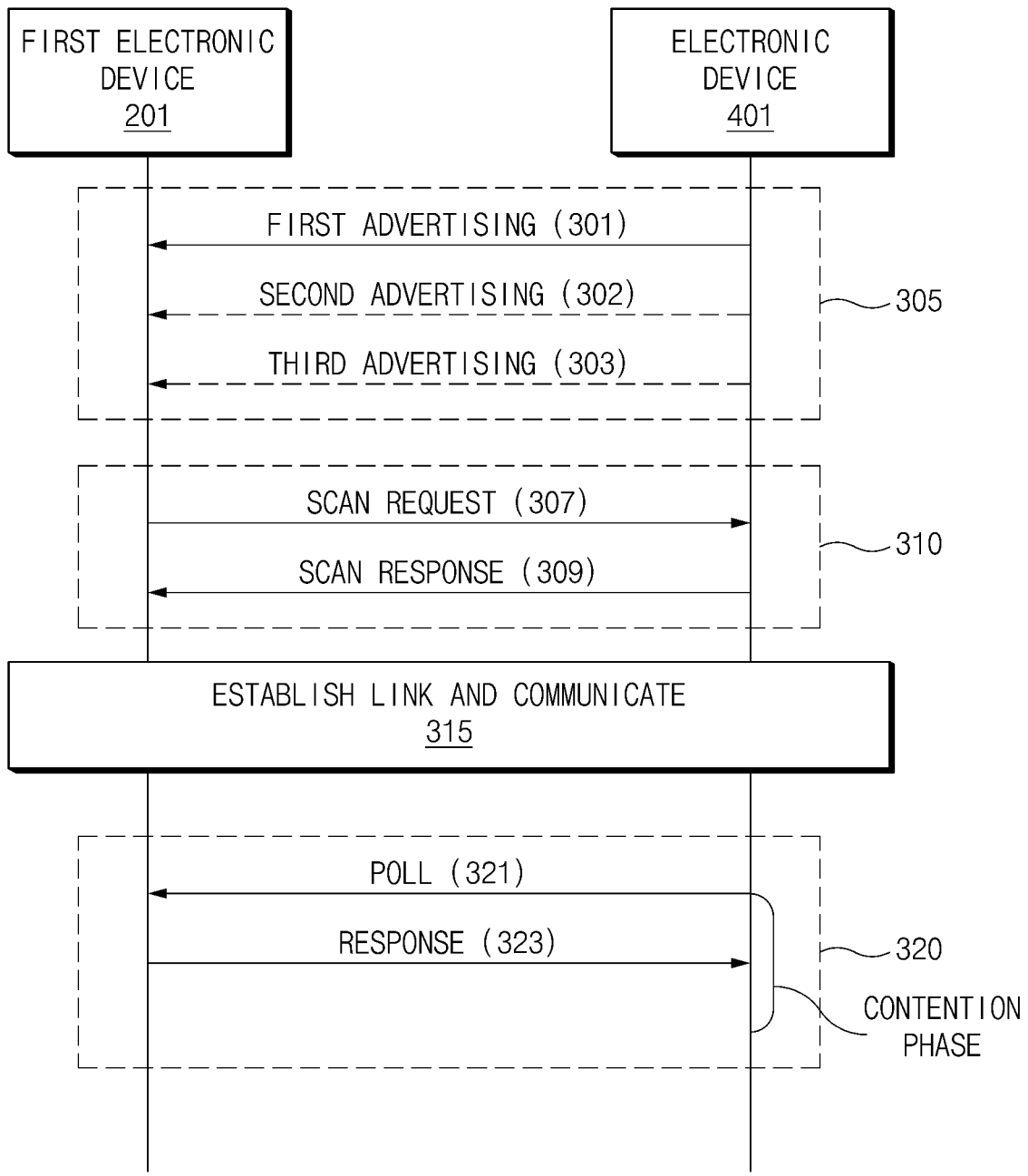
FIG. 3 is a signal flow diagram for UWB ranging according to an embodiment.

FIG. 3 is a signal flow diagram for UWB ranging according to an embodiment.

According to an embodiment, in operation 305, the electronic device 401 may transmit an advertising signal. For example, the electronic device 401 may transmit the advertising signal based on Bluetooth protocol (e.g., Bluetooth legacy and/or BLE). The electronic device 401 may transmit signals of first advertising 301, second advertising 302, and third advertising 303. For example, each of the signals of the first advertising 301, the second advertising 302, and the third advertising 303 may include an advertising packet containing information (e.g., identifier and/or Bluetooth address information) about the electronic device 401. The advertising packet may be multicast or broadcast. For example, the signals of the first advertising 301, the second advertising 302, and the third advertising 303 may be transmitted through different channels (e.g., one of Bluetooth channels 37, 38, and 39). The electronic device 401 may search for a peripheral device by periodically performing advertising (e.g., operation 305). Although FIG. 3 illustrates that an advertising signal is transmitted three times, embodiments of the disclosure are not limited thereto.

For example, the first electronic device 201 may be configured to periodically perform Bluetooth scanning. In this example, the first electronic device 201 may periodically monitor reception of Bluetooth signals using one or more reception paths of the Bluetooth communication circuit. In the example of FIG. 3, the first electronic device 201 may receive the first advertising 301.

In operation 310, the electronic device 401 and the first electronic device 201 may perform Bluetooth scanning. For example, the first electronic device 201 may transmit a scan request 307 to the electronic device 401 in response to the first advertising 301. The scan request 307 may include information (e.g., identification information and Bluetooth address information) of the first electronic device 201. The electronic device 401 may transmit a scan response 309 to the first electronic device 201 in response to reception of the scan request 307.

In operation 315, the first electronic device 201 and the electronic device 401 may establish a link and communicate with each other. For example, the electronic device 401 may transmit a connection request (e.g., low energy (LE) connection request) to the first electronic device 201, and the first electronic device 201 may respond to the connection request to thereby establish a link between the first electronic device 201 and the electronic device 401. After establishing the link, the first electronic device 201 and the electronic device 401 may communicate with each other through the established link. For example, the electronic device 401 may initiate UWB ranging with the first electronic device 201 by transmitting a UWB ranging instruction signal through the established link. In this example, the electronic device 401 may identify whether the first electronic device 201 supports UWB ranging through the established link, and may transmit the UWB ranging instruction signal if the first electronic device 201 is capable of performing UWB ranging. The first electronic device 201, which has received the UWB ranging instruction signal, may activate a communication module for UWB communication.

According to an embodiment, operation 315 may be skipped. The electronic device 401 may perform UWB ranging (e.g., operation 320) immediately after performing scanning (operation 310) with the first electronic device 201. For example, a UWB application for file sharing may attempt to perform UWB ranging after confirming presence of a peripheral device (e.g., the first electronic device 201) through Bluetooth scanning. In this case, the electronic device 401 may transmit, to the first electronic device 201, information instructing initiation of UWB ranging (e.g., operation 320) through the scan response 309.

According to an embodiment, in the case of a UWB application (e.g., keyless entry) that requires security, the electronic device 401 may share required information by performing the operation 315. For example, the electronic device 401 may perform UWB ranging after exchanging important information such as unique identifiers and/or secure ranging measurement through the established link.

In operation 320, the first electronic device 201 and the electronic device 401 may perform UWB ranging. For example, the electronic device 401 may transmit a poll 321. The electronic device 401 may transmit (e.g., broadcast) the poll 321 at specified intervals. The poll 321 may include a contention phase duration value (e.g., the number of unit slots). After transmitting the poll 321, the electronic device 401 may activate a reception path of a UWB communication module, and may attempt to receive a response signal during the contention phase duration. The first electronic device 201, which has received the poll 321, may transmit a response 323 (e.g., UWB frame) to the poll 321. For example, the first electronic device 201 may transmit (e.g., unicast) the response 323 to the electronic device 401 at any point of time within the contention phase duration value indicated by the poll 321. For example, the response 323 may include positioning information (e.g., arrival angle), reception time information, signal-to-noise ratio (SNR), and/or response time information.

According to an embodiment, the electronic device 401 may measure the distance between the electronic device 401 and the first electronic device 201 by using the round trip time (RTT) and response time information based on the poll 321 and the response 323. A UWB application of the electronic device 401 may be configured to perform an operation (e.g., keyless entry) based on the measured distance.

Although the descriptions of the example of FIG. 3 are focused on the first electronic device 201, other electronic devices may be present nearby as illustrated in FIG. 2. Conventionally, collisions may occur between responses since multiple electronic devices may be transmitting their responses to the poll of the electronic device 401. The contention phase duration may be increased in order to reduce the collisions, but accuracy of positioning may decrease due to the increase in the contention phase duration.

According to an embodiment, only one electronic device (e.g., the first electronic device 201) among a plurality of electronic devices (e.g., the first electronic device 201, the second electronic device 202, and/or the third electronic device 203) belonging to the same account may exclusively respond to the poll signal of the electronic device 401. For example, the electronic device 401 may determine one peripheral electronic device based on account information and communication quality of peripheral electronic devices, and may perform UWB communication with the determined peripheral electronic device. Since the electronic device 401 determines a device with which to perform UWB communication, power consumption of the peripheral electronic devices for UWB ranging may reduce, and collisions between the peripheral electronic devices may be prevented.

In operation 320, for example, the electronic device 401 and the first electronic device 201 may perform single sided two way ranging (SS-TWR). In this case, the electronic device 401 may measure the distance between the electronic device 401 and the first electronic device 201 based on the response 323 from the first electronic device 201. In operation 320, in another example, the electronic device 401 and the first electronic device 201 may perform double sided two way ranging (DS-TWR). For example, the electronic device 401 may transmit, to the first electronic device 201, a signal responding to the response 323 after receiving the response 323. In this case, not only the electronic device 401 but also the first electronic device 201 may measure the distance between the electronic device 401 and the first electronic device 201.

Hereinafter, certain embodiments of an electronic device will be described with reference to FIGS. 4 to 7.

Figure 4:
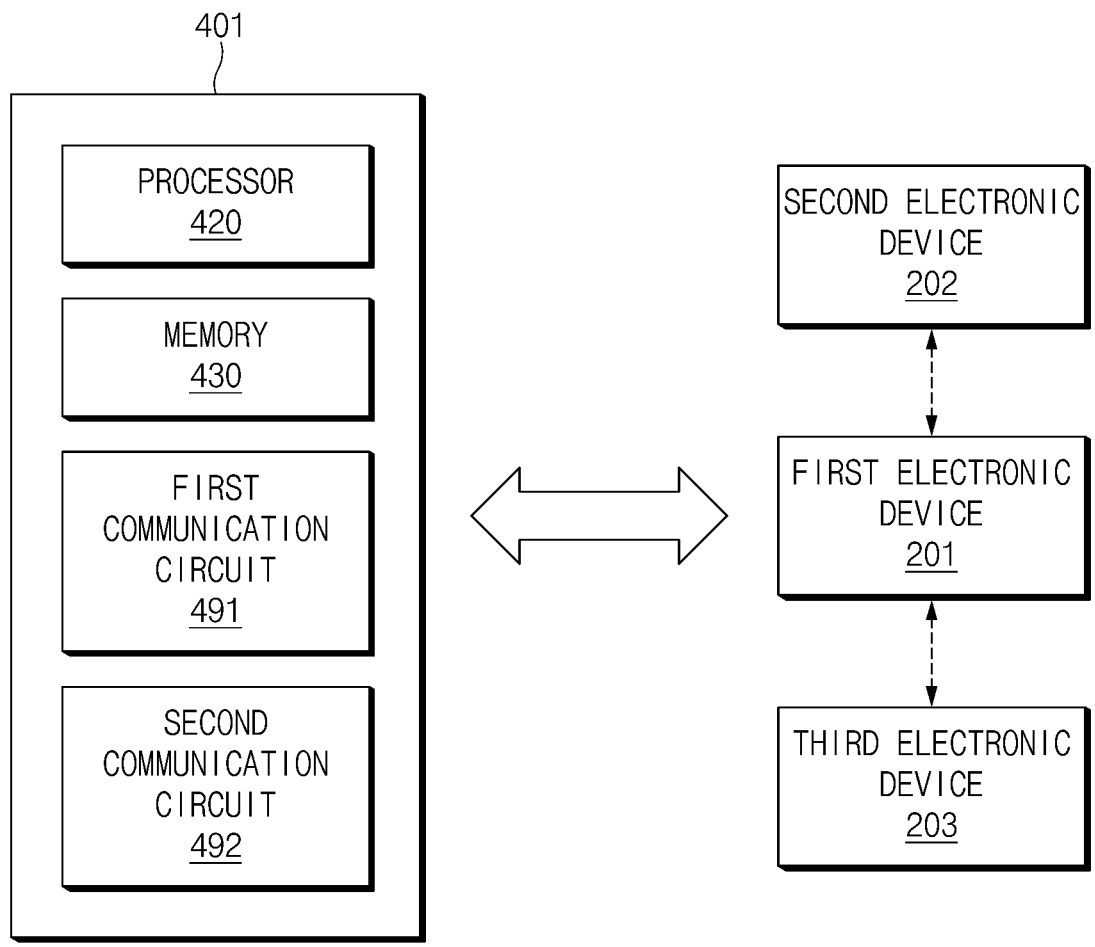
FIG. 4 is a block diagram illustrating an electronic device according to an embodiment.

FIG. 4 is a block diagram illustrating an electronic device according to an embodiment.

According to an embodiment, an electronic device 401 may include a processor 420 (e.g., the processor 120 of FIG. 1), a memory 430 (e.g., the memory 130 of FIG. 1), a first communication circuit 491 (e.g., the communication module 190 of FIG. 1), and/or a second communication circuit 492 (e.g., the communication module 190 of FIG. 1). The processor 420 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The processor 420 may be operatively connected to the memory 430, the first communication circuit 491, and the second communication circuit 492. The memory 430 may store instructions that, when executed, cause the processor 420 to perform various operations of the electronic device 401.

The processor 420 may communicate with other electronic devices using the first communication circuit 491 based on Bluetooth protocol. For example, the first communication circuit 491 may correspond to a communication module configured to support Bluetooth communication (e.g., Bluetooth legacy and/or BLE). The electronic device 401 may communicate with the first electronic device 201, the second electronic device 202, and/or the third electronic device 203 using the first communication circuit 491.

The processor 420 may communicate with other electronic devices (e.g., the first electronic device 201, the second electronic device 202, and/or the third electronic device 203) using the second communication circuit 492 based on UWB communication protocol. For example, the second communication circuit 492 may correspond to a communication module configured to support UWB communication. The electronic device 401 may communicate with the first electronic device 201, the second electronic device 202, and/or the third electronic device 203 using the second communication circuit 492.

The configuration of the electronic device 401 illustrated in FIG. 4 is exemplary, and embodiments of the disclosure are not limited thereto. For example, the electronic device 401 may further include a component not illustrated in FIG. 4. The electronic device 401, for example, may further include at least a portion of the components of the electronic device 101 of FIG. 1. The first electronic device 201, the second electronic device 202, and the third electronic device 203 may include components similar to those of the electronic device 401.

For example, the first electronic device 201, the second electronic device 202, and the third electronic device 203 may be electronic devices owned by the same user. In another example, the first electronic device 201, the second electronic device 202, and the third electronic device 203 may be electronic devices belonging to the same group or the same account. In yet another example, the first electronic device 201, the second electronic device 202, and the third electronic device 203 may be devices connected to the same device or the same access point (AP) (e.g., mobile hot spot).

According to an embodiment, the electronic device 401 may be configured to perform BLE scanning for the UWB ranging operation. The memory 430 of the electronic device 401 may store a UWB application. For example, the UWB application may be installed on the electronic device 401 by a manufacturer or by a user. The UWB application may perform BLE scanning for UWB ranging at any point in time or at a specified point of time. For example, the processor 420 may perform BLE scanning by transmitting advertising signals using the first communication circuit 491 in response to a request of the UWB application.

For example, when performing BLE scanning for UWB ranging, the processor 420 may deliver, to the UWB application, only information of an electronic device satisfying a specified condition among the discovered other electronic devices. For example, the electronic device satisfying the specified condition may be an electronic device in which a UWB application is installed. In another example, the electronic device satisfying the specified condition may be an electronic device corresponding to account information of another electronic device stored in the memory 430. For example, the account information may include account information of an electronic device that is to perform UWB communication with the electronic device 401. The account information may be input to the electronic device 401 by the user or may be received from an external server (not shown).

According to an embodiment, the electronic device 401 may communicate with at least one external electronic device (e.g., the first electronic device 201, the second electronic device 202, and/or the third electronic device 203). For example, the electronic device 401 may generate a link with at least one external electronic device by transmitting an advertising signal and receiving a response to the advertising signal. For example, the electronic device 401 may receive information including account information of the external electronic devices through the link. The electronic device 401 may identify at least one external electronic device associated with the same account or the same group using the account information of external electronic devices collected during a unit time.

According to an embodiment, the electronic device 401 may determine one external electronic device with which to perform UWB communication among at least one external electronic device associated with the same account or the same group. The electronic device 401 may determine one external electronic device with which to perform UWB communication based on communication quality. For example, the electronic device 401 may determine, as the external electronic device with which to perform UWB communication, an external electronic device having best communication quality (e.g., reception sensitivity and/or reception strength) among the external electronic devices associated with the same account or the same group. The electronic device 401 may communicate with a determined external electronic device using the second communication circuit 492. In this case, the electronic device 201 may disconnect links to other external electronic devices.

Hereinafter, communication of the electronic device 401 with the first electronic device 201, the second electronic device 202, and the third electronic device 203 will be described with reference to FIG. 5.

Figure 5:
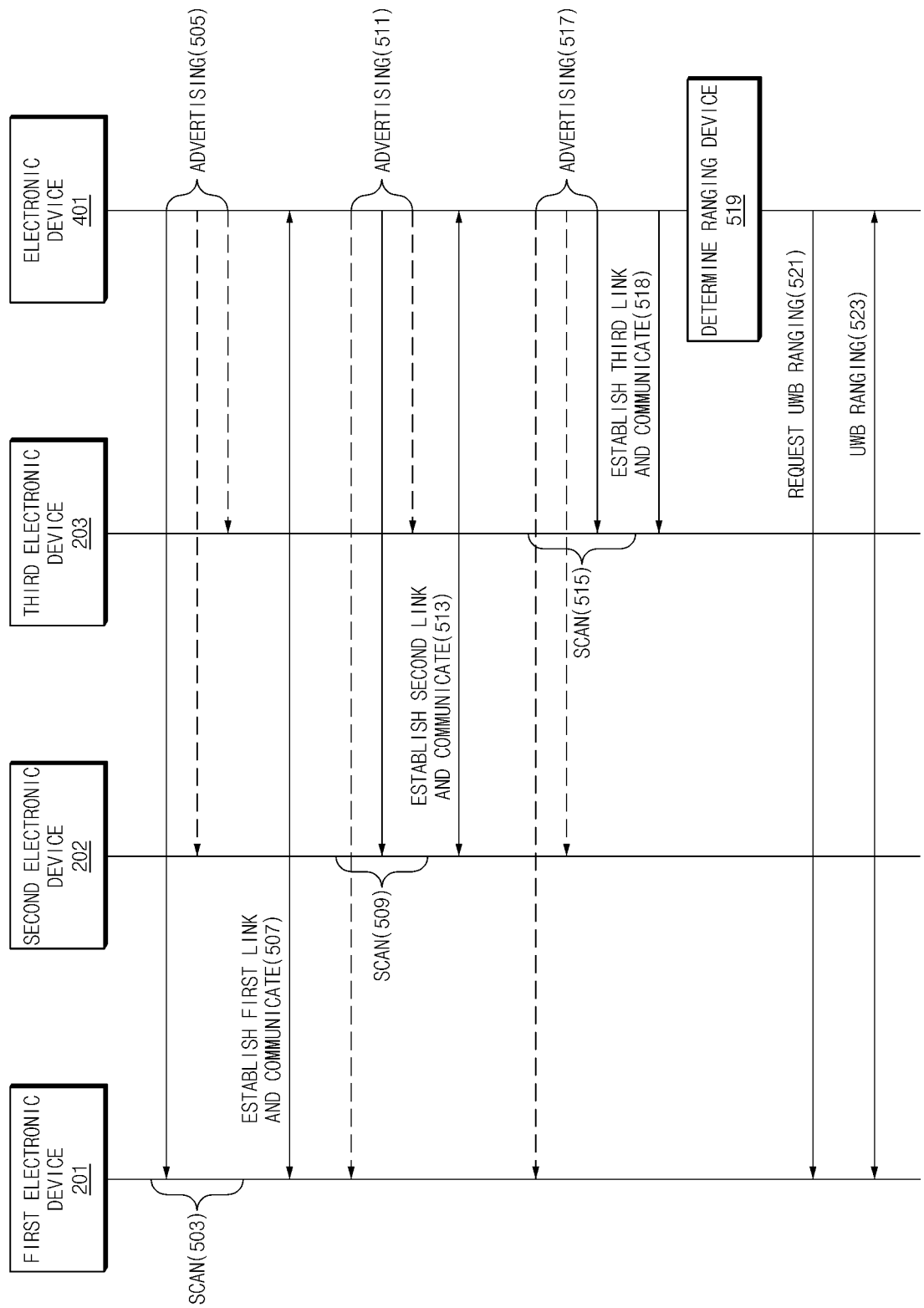
FIG. 5 is a signal flow diagram of a ranging device determination method according to an embodiment.

FIG. 5 is a signal flow diagram of a ranging device determination method according to an embodiment.

Referring to FIGS. 4 and 5, the first electronic device 201 may perform scanning in operation 503. The first electronic device 201 may perform Bluetooth scanning in order to perform UWB communication. For example, the Bluetooth scanning may be performed in response to a request of a UWB application installed on the first electronic device 201.

In this example, the UWB application may be installed on the first electronic device 201 by a manufacturer or by a user. The UWB application may perform BLE scanning for UWB ranging at any point in time or at a specified point of time.

The UWB application may set a scan parameter in the first electronic device 201. For example, the scan parameter may be set by a manufacturer or by a user. The scan parameter may include, for example, information of a duty cycle (e.g., activation time period and duration of the first communication circuit 491) of BLE scanning for UWB communication. The BLE scanning duty cycle may be set to 10% (e.g., total period 5000 ms, scanning period duration 500 ms). In this case, the first electronic device 201 may monitor a first channel (e.g., channel 37) for 500 ms after the start point in time for BLE scanning, and thereafter may stop the BLE scanning for 4500 ms. The first electronic device 201 may monitor a second channel (e.g., channel 38) for the subsequent 500 ms, and may stop the BLE scanning for 4500 ms. Thereafter, the first electronic device 201 may monitor a third channel (e.g., channel 39) for the subsequent 500 ms, and may stop the BLE scanning for 4500 ms. For example, the first electronic device 201 may perform the above-mentioned BLE scanning repeatedly until Bluetooth function is deactivated, the UWB application requests stopping of the BLE scanning, or the scanning is stopped based on Bluetooth protocol.

In operation 505, the electronic device 401 may perform advertising. For example, the electronic device 401 may periodically perform advertising in order to search for a device supporting UWB communication to trigger UWB communication. The electronic device 401 may be configured to multicast or broadcast an advertising signal including an advertising packet. The advertising packet may include at least one of identification information, service information (e.g., UWB service), manufacturer information, transmission power, and/or detection area of the electronic device 401. In an example, the electronic device 401 may be configured to continuously perform advertising while being supplied with power. In another example, the electronic device 401 may perform advertising based on a user input or at specified intervals.

The first electronic device 201 may receive an advertising signal from the electronic device 401 through scanning (e.g., operation 503). For example, the first electronic device 201 may output a user interface in response to reception of the advertising signal. The user interface may include information of the electronic device 401 recognized.

In response to reception of the advertising signal, the first electronic device 201 and the electronic device 401 may establish a first link and communicate with each other in operation 507. For example, the first electronic device 201 and the electronic device 401 may establish the first link by performing operations 310 and 315 of FIG. 3. The electronic device 401 may establish the first link using the first communication circuit 491.

After establishing the first link, the electronic device 401 may communicate with the first electronic device 201. For example, the electronic device 401 may receive, from the first electronic device 201, at least one piece of information associated with an account of the first electronic device 201. For example, the first electronic device 201 may transmit the at least one piece of information associated with account to the electronic device 401 via the first link in response to a request of a UWB application or a request of a BLE stack. The information associated with the account may include at least one of a synced identifier of the first electronic device 201, a Bluetooth address of a representative electronic device of the user of the first electronic device 201, or a value based on account information (e.g., Samsung account information) associated with the first electronic device 201. For example, the value based on account information associated with the first electronic device 201 may include a hash value generated based on the account information.

In an example, the first electronic device 201 may transmit state information of the first electronic device 201 through the first link. For example, the state information may include at least one of a battery state, operation state, user setting, movement state, and/or movement possibility of the first electronic device 201. For example, the electronic device 401 may identify whether the first electronic device 201 is a stationary device or mobile device using the movement state or movement possibility. When determining a device with which to perform UWB communication, the electronic device 401 may consider mobility of the first electronic device 201 together with communication quality.

In operation 509, the second electronic device 202 may perform scanning. The second electronic device 202 may perform Bluetooth scanning for UWB communication. For example, the second electronic device 202 may perform scanning in a manner similar to operation 503 of the first electronic device 201.

In operation 511, the electronic device 401 may perform advertising. The electronic device 401 may perform advertising in a manner similar to operation 505. The second electronic device 202 may receive advertising from the electronic device 401 through scanning (operation 509).

In response to reception of the advertising signal, the electronic device 401 may establish a second link and communicate with the second electronic device 202 in operation 513. For example, the second electronic device 202 may establish the second link and communicate in a manner similar to operation 507. The electronic device 401 may receive, through the second link, at least one piece of information (e.g., at least one of a synced identifier of the second electronic device 202, a Bluetooth address of a representative electronic device of the user of the second electronic device 202, or a value based on account information (e.g., Samsung account information) associated with the second electronic device 202) associated with an account of the second electronic device 202. The electronic device 401 may receive, through the second link, state information (e.g., battery state, operation state, user setting, movement state, and/or movement possibility) of the second electronic device 202.

In operation 515, the third electronic device 203 may perform scanning. The third electronic device 203 may perform Bluetooth scanning for UWB communication. For example, the third electronic device 203 may perform scanning in a manner similar to operation 503 of the first electronic device 201.

In operation 517, the electronic device 401 may perform advertising. The electronic device 401 may perform advertising in a manner similar to operation 505. The third electronic device 203 may receive advertising from the electronic device 401 through scanning (operation 515).

In response to reception of the advertising signal, the electronic device 401 may establish a third link and communicate with the third electronic device 203 in operation 518. For example, the third electronic device 203 may establish the third link and communicate in a manner similar to operation 507. The electronic device 401 may receive, through the third link, at least one piece of information (e.g., at least one of a synced identifier of the third electronic device 203, a Bluetooth address of a representative electronic device of the user of the third electronic device 203, or a value based on account information (e.g., Samsung account information) associated with the third electronic device 203) associated with an account of the third electronic device 203. The electronic device 401 may receive, through the third link, state information (e.g., battery state, operation state, user setting, movement state, and/or movement possibility) of the third electronic device 203.

According to certain embodiments, operations 503 and 507 performed by the first electronic device 201, operations 509 and 513 performed by the second electronic device 202, and operations 515 and 518 performed by the third electronic device 203 may be performed in a different sequence or may be performed substantially simultaneously. For example, at least a portion of scanning operations (e.g., scan 503, scan 509, and/or scan 515) of the first electronic device 201 to the third electronic device 203 may be performed substantially simultaneously.

According to certain embodiments, the electronic device 401 may additionally perform an advertising operation for detecting at least one peripheral electronic device (e.g., the first electronic device 201, the second electronic device 202, and/or the third electronic device 203). For example, the electronic device 401 may additionally perform the advertising operation for a specified time.

In operation 519, the electronic device 401 may determine a ranging device with which to perform ranging. According to an embodiment, the electronic device 401 may identify at least one electronic device group using received at least one piece of information associated with an account, and may determine one electronic device with which to perform ranging based on communication quality in the identified one electronic device group.

The electronic device 401 may identify a plurality of electronic devices belonging to the same account, the same user, or the same group using the information associated with an account. For example, the electronic device 401 may identify electronic devices having the same identifier (e.g., synced identifier), the same Bluetooth address of a representative electronic device, or the same account information-based value (e.g., a hash value), as the plurality of electronic devices belonging to the same account, the same user, or the same group.

In an example, account identifiers (e.g. synced identifiers) of the second electronic device 202 and the third electronic device 203 may be set to "01:08:84:72:55:5F", and an account identifier of the first electronic device 201 may be set to "10:89:66:43:21:1A". In this case, the electronic device 401 may identify the second electronic device 202 and the third electronic device 203 having the same account identifier as electronic devices belonging to the same account, the same user, or the same group.

In an example, the electronic device 401 may store, in the memory 430, information of electronic devices belonging to the same group. The electronic device 401 may identify electronic devices belonging to the same group (e.g., family account) using a database stored in the memory 430. For example, even if the first electronic device 201 has an account identifier different from that of the second electronic device 202, the electronic device 401 may identify the first electronic device 201 and the second electronic device 202 as electronic devices belonging to the same group using the database.

In an example, the electronic device 401 may identify electronic devices belonging to the same account, the same user, or the same group based on the number of discovered external electronic devices. When at least a specified number of electronic devices are discovered through advertising, the electronic device 401 may identify electronic devices belonging to the same account, the same user, or the same group based on account information of each of the external electronic devices. When less than the specified number of electronic devices are discovered through advertising, the electronic device 401 may identify electronic devices belonging to the same account, the same user, or the same group using the database stored in the memory 430.

After identifying electronic devices (hereinafter referred to as a first electronic device group) belonging to the same account, the same user, or the same group, the electronic device 401 may identify one electronic device with which to perform UWB communication from the first electronic device group. For example, the electronic device 401 may determine an electronic device with which to perform UWB communication based on communication quality. The communication quality may include at least one of reception sensitivity, reception strength, the number of used channels, noise level for each level, packet retransmission rate, bit error rate (BER), packet error rate (PER), and/or the number of missing events. In the following descriptions, it may be assumed that the first electronic device 201, the second electronic device 202, and the third electronic device 203 belong to the first electronic device group.

According to an embodiment, the electronic device 401 may identify communication quality of the first link, the second link, and the third link, and may determine an electronic device associated with the link having the best communication quality as the electronic device with which to perform UWB communication. For example, when the reception sensitivity or reception strength (e.g., average reception sensitivity or reception strength (e.g., received signal strength indicator (RSSI)) of the first link is highest, the electronic device 401 may determine the first electronic device 201 as the electronic device (e.g., ranging device) with which to perform UWB communication. In another example, when the number of used channels received from the first electronic device 201 is largest, the electronic device 401 may determine the first electronic device 201 as the electronic device with which to perform UWB communication. In yet another example, when the noise level of a channel of the first link used to communicate with the first electronic device 201 is lowest, the electronic device 401 may determine the first electronic device 201 as the electronic device with which to perform UWB communication. In still yet another example, when an error rate (packet retransmission rate, bit error rate (BER), packet error rate (PER), and/or the number of missing events) related to the first link is lowest, the first electronic device 201 may be determined as the electronic device with which to perform UWB communication.

According to an embodiment, the electronic device 401 may determine the electronic device with which to perform UWB communication based on communication quality and state information. For example, the electronic device 401 may determine the electronic device with which to perform UWB communication by comparing communication quality between external electronic devices, and the battery states that are at least at a specified battery level. In another example, the electronic device 401 may determine the electronic device with which to perform UWB communication by comparing communication quality between external electronic devices, and the operation states or user settings allowing for UWB communication. In yet another example, the electronic device 401 may determine the electronic device with which to perform UWB communication by comparing communication quality amongst external electronic devices with the mobilities lower than a specified mobility. In still yet another example, the electronic device 401 may determine the electronic device with which to perform UWB communication by comparing communication quality amongst external electronic devices with movement possibilities lower than a specified value.

In the example of FIG. 5, the electronic device 401 may determine the first electronic device 201 as the ranging device. In operation 521, the electronic device 401 may request the first electronic device 201 to perform UWB ranging. For example, the electronic device 401 may transmit, to the first electronic device 201, a signal instructing initiation of UWB ranging through the first link.

In operation 523, the electronic device 401 may perform UWB ranging (e.g., operation 320 of FIG. 3) with the first electronic device 201. For example, the electronic device 401 may perform UWB ranging with the first electronic device 201 using the second communication circuit 492.

In the examples described above with reference to FIG. 5, the electronic device 401 determines one electronic device with which to perform UWB communication, but embodiments of the disclosure are not limited thereto. In an example, the electronic device 401 may determine a plurality of electronic devices with which to perform UWB communication. According to an embodiment, the electronic device 401 may determine the number of electronic devices with which to perform UWB communication based on at least one of importance or communication quality of electronic device. For example, when the security level of the electronic device 401 is high or high accuracy positioning is required, the electronic device 401 may perform UWB communication with one or more external electronic devices. When the difference of reception strength (e.g., RSSI) between a plurality of external electronic devices is at least a specified value, the electronic device 401 may determine an external electronic device with which to perform UWB communication for each reception strength within a certain range. For example, the electronic device 401 may determine one of a plurality of external electronic devices belonging to a first RSSI range as the external electronic device with which to perform UWB communication, and may determine one of a plurality of external electronic devices belonging to a second RSSI range as another external electronic device with which to perform UWB communication.

Although FIG. 5 illustrates that ranging is performed one time, embodiments of the disclosure are not limited thereto. For example, the electronic device 401 may determine (e.g., operation 519), by a specified period, an external electronic device with which to perform ranging. Even after determining the external electronic device with which to perform UWB communication, the electronic device 401, prior to a following period, may perform UWB ranging with the external electronic device again, or may perform UWB ranging with another external electronic device for which UWB ranging has not been previously performed.

Although not illustrated in the drawings, the electronic device 401 may perform the advertising transmission operation (e.g., operation 505) for searching for another external electronic device with which to perform ranging at another specified time interval. For example, the electronic device 401 may determine (e.g., operation 519) another external electronic device with which to perform ranging by establishing a link and communicating with the newly discovered electronic device.

Figure 6:
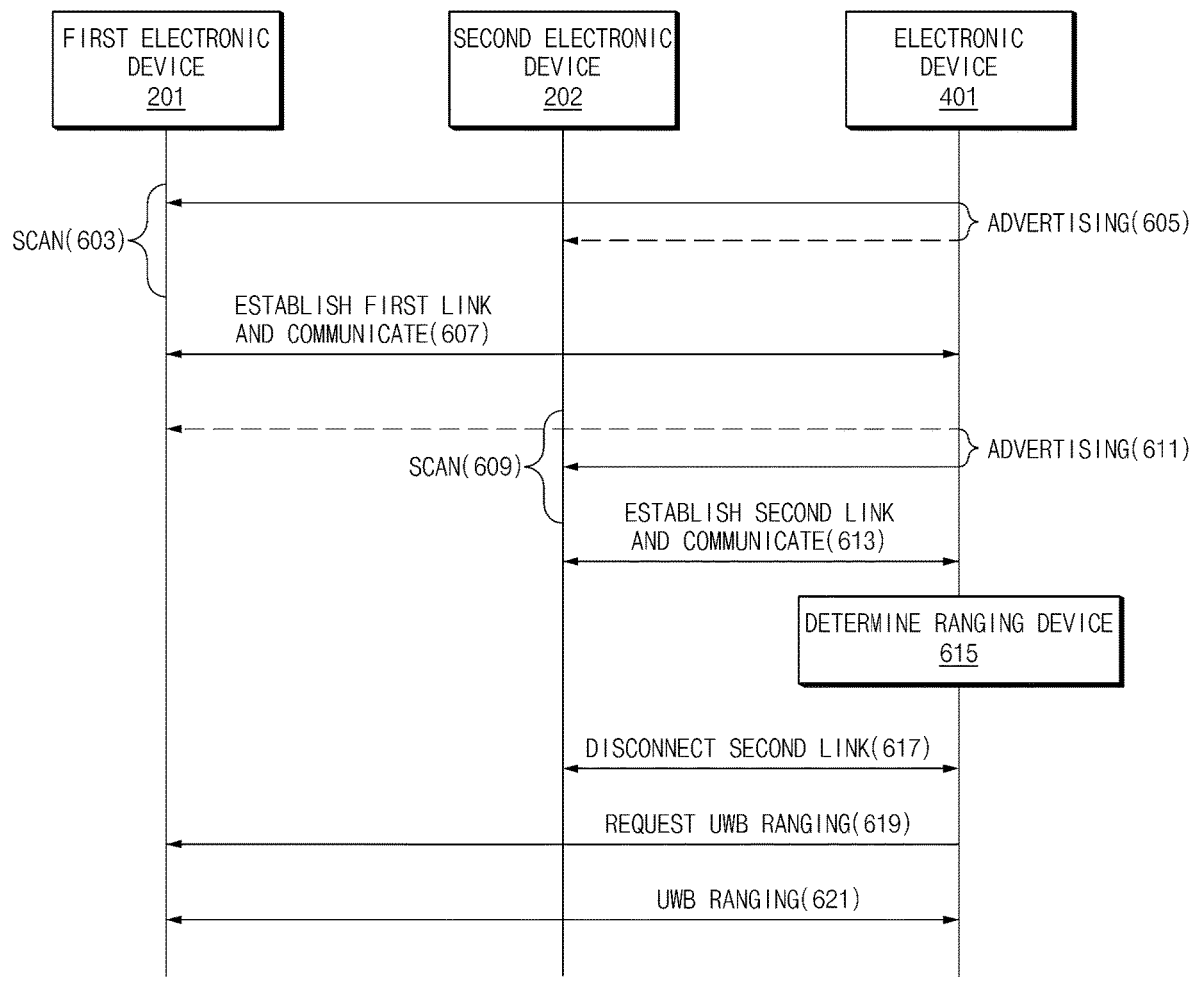
FIG. 6 is a signal flow diagram of a ranging device determination method according to an embodiment.

FIG. 6 is a signal flow diagram of a ranging device determination method according to an embodiment.

Referring to FIGS. 4 and 6, the first electronic device 201 may perform scanning (e.g., operation 503 of FIG. 5) in operation 603. In operation 605, the electronic device 401 may perform advertising (e.g., operation 505 of FIG. 5). The first electronic device 201 may receive the advertising signal from the electronic device 401 through scanning (e.g., operation 603). In response to reception of the advertising signal, the first electronic device 201 and the electronic device 401 may establish a first link and communicate (e.g., operation 507 of FIG. 5) with each other in operation 607.

In operation 609, the second electronic device 202 may perform scanning (e.g., operation 509 of FIG. 5). The second electronic device 202 may perform Bluetooth scanning for UWB communication. In operation 611, the electronic device 401 may perform advertising (e.g., operation 511 of FIG. 5). In response to reception of the advertising signal, the electronic device 401 may establish a second link and communicate (e.g., operation 513 of FIG. 5) with the second the electronic device 202 in operation 613.

In operation 615, the electronic device 401 may determine the ranging device with which to perform ranging. For example, the electronic device 401 may determine the ranging device according to the methods described above in connection with operation 519 of FIG. 5.

In the example of FIG. 6, if the electronic device 401 determines a ranging device, the electronic device 401 may disconnect links with other devices. In operation 617, the electronic device 401 may disconnect the second link with the second electronic device 202. Although the electronic device 401 may also maintain a link with an electronic device for which ranging is not performed as in the example of FIG. 5, the electronic device 401 may reduce power consumption of peripheral electronic devices by disconnecting the link.

In operation 619, the electronic device 401 may request (e.g., operation 521 of FIG. 5) the first electronic device 201 to perform UWB ranging. In operation 621, the electronic device 401 may perform UWB ranging (e.g., operation 320 of FIG. 3) with the first electronic device 201.

Figure 7:
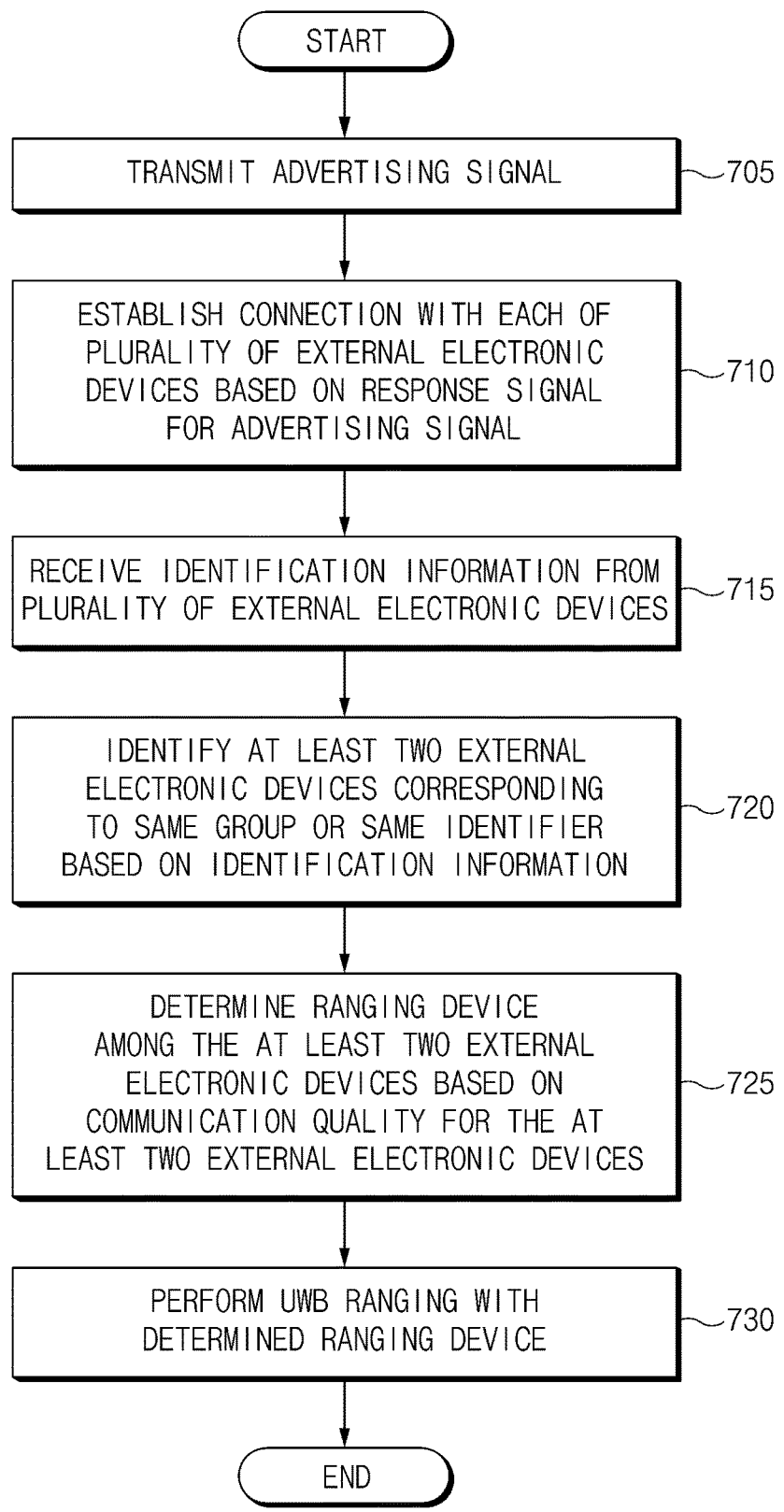
FIG. 7 is a flowchart illustrating a UWB-based communication method according to an embodiment.

FIG. 7 is a flowchart illustrating a UWB-based communication method according to an embodiment.

Referring to FIGS. 4 and 7, in operation 705, an electronic device (e.g., the electronic device 401 of FIG. 4) may transmit an advertising signal. For example, the electronic device 401 may transmit the advertising signal via multicast or broadcast using a first communication circuit (e.g., the first communication circuit 491 of FIG. 4). For example, the electronic device 401 may transmit the advertising signal at specified time intervals, or based on a user input or a request of a UWB application. The advertising signal may include identification information of the electronic device 401.

In operation 710, the electronic device 401 may establish a connection with each of a plurality of external electronic devices (e.g., the first electronic device 201, the second electronic device 202, and/or the third electronic device 203) based on the response signals for the advertising signal transmitted from the plurality of external electronic devices. For example, the electronic device may establish BLE links using the first communication circuit 491.

In operation 715, the electronic device 401 may receive identification information from the plurality of external electronic devices. Each piece of the identification information (e.g., a synced identifier, a Bluetooth address of a representative device, or a hash value) may be associated with an account of an external electronic device. In an example, the electronic device 401 may further receive state information (e.g., battery state, operation state, user setting, movement state, and/or movement possibility) from the plurality of external electronic devices.

In operation 720, the electronic device 401 may identify, based on the identification information, at least two external electronic devices corresponding to the same group or the same identifier. For example, the electronic device 401 may identify at least two external electronic devices having the same identification information or having identifiers belonging to the same group.

In operation 725, the electronic device 401 may determine a ranging device among the at least two external electronic devices based on communication quality for the at least two external electronic devices. For example, the electronic device 401 may determine at least one ranging device according to the various methods described above in relation to operation 519 of FIG. 5. As described above with reference to FIG. 5, the electronic device 401 may determine a ranging device based on not only communication quality but also state information. In an example, the electronic device 401 may disconnect from electronic devices other than a determined ranging device.

According to an embodiment, when external electronic devices corresponding to different groups or different identifiers are identified, the electronic device 401 may provide the above information to the user, and may receive, from the user, a selection of a device with which to perform ranging.

In operation 730, the electronic device 401 may perform UWB ranging with the determined ranging device. For example, the electronic device 401 may request (e.g., operation 521 of FIG. 5) UWB ranging using the first communication circuit 491, and may perform (e.g., operation 523 of FIG. 5) UWB ranging with the determined ranging device using the second communication circuit 492.

Although it has been described with reference to FIGS. 4 to 7 that the electronic device 401 performs UWB ranging with a ranging device determined among a plurality of electronic devices, embodiments of the disclosure are not limited thereto. According to an embodiment, the electronic device 401 may perform ranging with a plurality of electronic devices among various peripheral electronic devices. For example, if a peripheral electronic device having higher link quality is discovered after a ranging device is determined, the electronic device 401 may perform additional UWB ranging with the peripheral electronic device. According to an embodiment, the electronic device 401 may perform UWB ranging with all of peripheral electronic devices. For example, if no peripheral electronic device responds to advertising, the electronic device 401 may perform UWB ranging with all of peripheral electronic devices. In another example, the electronic device 401 may perform UWB ranging based on the number of peripheral electronic devices responding to advertising. If the number of peripheral electronic devices responding to advertising is at least a specified number, the electronic device 401 may determine (e.g., operation 725) a ranging device among the peripheral electronic devices, and may perform UWB ranging with a determined ranging device. If the number of peripheral electronic devices responding to advertising is less than the specified number, the electronic device 401 may perform UWB ranging with all of responding peripheral electronic devices.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a first communication circuit supporting communication based on Bluetooth protocol;
a second communication circuit supporting communication based on an ultra-wideband (UWB) protocol;
a processor operatively connected to the first communication circuit and the second communication circuit; and
a memory operatively connected to the processor,
wherein the memory stores instructions that, when executed by the processor, cause the electronic device to:
transmit an advertising signal using the first communication circuit;
establish a Bluetooth connection with each of a plurality of external electronic devices based on one or more response signals for the advertising signal using the first communication circuit;
receive identifiers from each of the plurality of external electronic devices over the Bluetooth connection;
accessing a database using the received identifiers from each of the plurality of external electronic devices to identify accounts associated with each one of the plurality of external electronic devices and determine which ones of the plurality of external electronic devices are associated with a same account as the electronic device;
determine a ranging device among the ones of the plurality of external electronic devices based on communication quality related to the plurality of external electronic devices;
release connections with the plurality of external electronic devices other than the ranging device; and
perform exclusive UWB ranging with the determined ranging device using the second communication circuit.

2. The electronic device of claim 1, wherein the instructions, when executed by the processor, cause the electronic device to determine, as the ranging device, a first external electronic device having highest communication quality among the ones of the plurality of external electronic devices.

3. The electronic device of claim 1, wherein the instructions, when executed by the processor, cause the electronic device to determine, as the ranging device, a first external electronic device having highest reception sensitivity or highest reception strength among the ones of the plurality of external electronic devices.

4. The electronic device of claim 1, wherein the instructions, when executed by the processor, cause the electronic device to determine, as the ranging device, a first external electronic device having a lowest error rate among the ones of the plurality of external electronic devices.

5. The electronic device of claim 1, wherein the instructions, when executed by the processor, cause the electronic device to determine, as the ranging device, a first external electronic device having a largest number of used channels or associated with a channel with a lowest noise level among the ones of the plurality of external electronic devices.

6. The electronic device of claim 1,
wherein the instructions, when executed by the processor, cause the electronic device to receive state information from the plurality of external electronic devices using the first communication circuit,
wherein the state information includes a battery state and/or a user setting.

7. The electronic device of claim 6, wherein the instructions, when executed by the processor, cause the electronic device to determine the ranging device by comparing the communication quality between the ones of the plurality of external electronic devices with the battery state higher than a specified charge amount.

8. The electronic device of claim 6, wherein the instructions, when executed by the processor, cause the electronic device to determine the ranging device by comparing the communication quality between the ones of the plurality of external electronic devices with the user setting for allowing UWB ranging.

9. The electronic device of claim 1, wherein the instructions, when executed by the processor, cause the electronic device to identify the ones of the plurality of external electronic devices based on group information stored in the memory and the received identifier.

10. The electronic device of claim 9, wherein the instructions, when executed by the processor, cause the electronic device to:
identify a number of the plurality of external electronic devices based on the one or more response signals;
identify external electronic devices having identical identifiers as the ones of the plurality of external electronic devices when the number of the plurality of external electronic devices is at least a specified number; and
identify the external electronic devices associated with the same account as the ones of the plurality of external electronic devices using the group information when the number of the plurality of external electronic devices is less than the specified number.

11. The electronic device of claim 1, wherein identifying accounts associated with each one of the plurality of external electronic devices comprises determining a user account associated with at least one of the plurality of external electronic devices that is different from the same account as the electronic device.

12. A method for ultra-wideband (UWB) communication of an electronic device, comprising:
transmitting an advertising signal based on a Bluetooth protocol;
establishing a Bluetooth connection, that is based on the Bluetooth protocol, with each of a plurality of external electronic devices based on one or more response signals for the advertising signal;
receiving identifiers from each of the plurality of external electronic devices over the Bluetooth connection;
accessing a database using the received identifiers from each of the plurality of external electronic devices to identifying accounts associated with each one of the plurality of external electronic devices and determine which ones of the plurality of external electronic devices are associated with a same account as the electronic device;
determining a ranging device among the one of the plurality of external electronic devices based on communication quality related to the plurality of external electronic devices;
releasing connections with the plurality of external electronic devices other than the ranging device; and performing exclusive UWB ranging with the determined ranging device based on a UWB protocol.

13. The method of claim 12, wherein the determining of the ranging device further comprises determining, as the ranging device, a first external electronic device having highest communication quality among the ones of the plurality of external electronic devices.

14. The method of claim 12, wherein the determining of the ranging device further comprises determining, as the ranging device, a device having highest reception sensitivity or highest reception strength among the ones of the plurality of external electronic devices.

15. The method of claim 12, wherein the determining of the ranging device further comprises determining, as the ranging device, a device having a lowest error rate among the ones of the plurality of external electronic devices.

16. The method of claim 12, wherein the determining of the ranging device further comprises determining, as the ranging device, a device having a largest number of used channels or associated with a channel with a lowest noise level among the ones of the plurality of external electronic devices.

17. The method of claim 12, further comprising:
receiving state information from the plurality of external electronic devices based on the Bluetooth protocol,
wherein the state information includes a battery state and/or a user setting.

18. The method of claim 17, wherein the determining of the ranging device further comprises determining the ranging device by comparing the communication quality between the ones of the plurality of external electronic devices with the battery state higher than a specified charge amount.

19. The method of claim 17, wherein the determining of the ranging device further comprises determining the ranging device by comparing the communication quality between the ones of the plurality of external electronic devices with the user setting for allowing UWB ranging.

20. The method of claim 12, wherein the identifying of the ones of the plurality of external electronic devices further comprises identifying the ones of the plurality of external electronic devices based on group information stored in the electronic device and the received identifier.

21. The method of claim 20, wherein the identifying of the ones of the plurality of external electronic devices based on group information stored in the electronic device and the received identifier further comprises:
identifying a number of the plurality of external electronic devices based on the one or more response signals;
identifying at least one external electronic device as the ones of the plurality of external electronic devices when the number of the plurality of external electronic devices is at least a specified number; and identifying at least one external electronic device belonging to a same group as the ones of the plurality of external electronic devices using the group information when the number of the plurality of external electronic devices is less than the specified number.

* * * * *